United States Patent Office 3,436,019
Patented Apr. 1, 1969

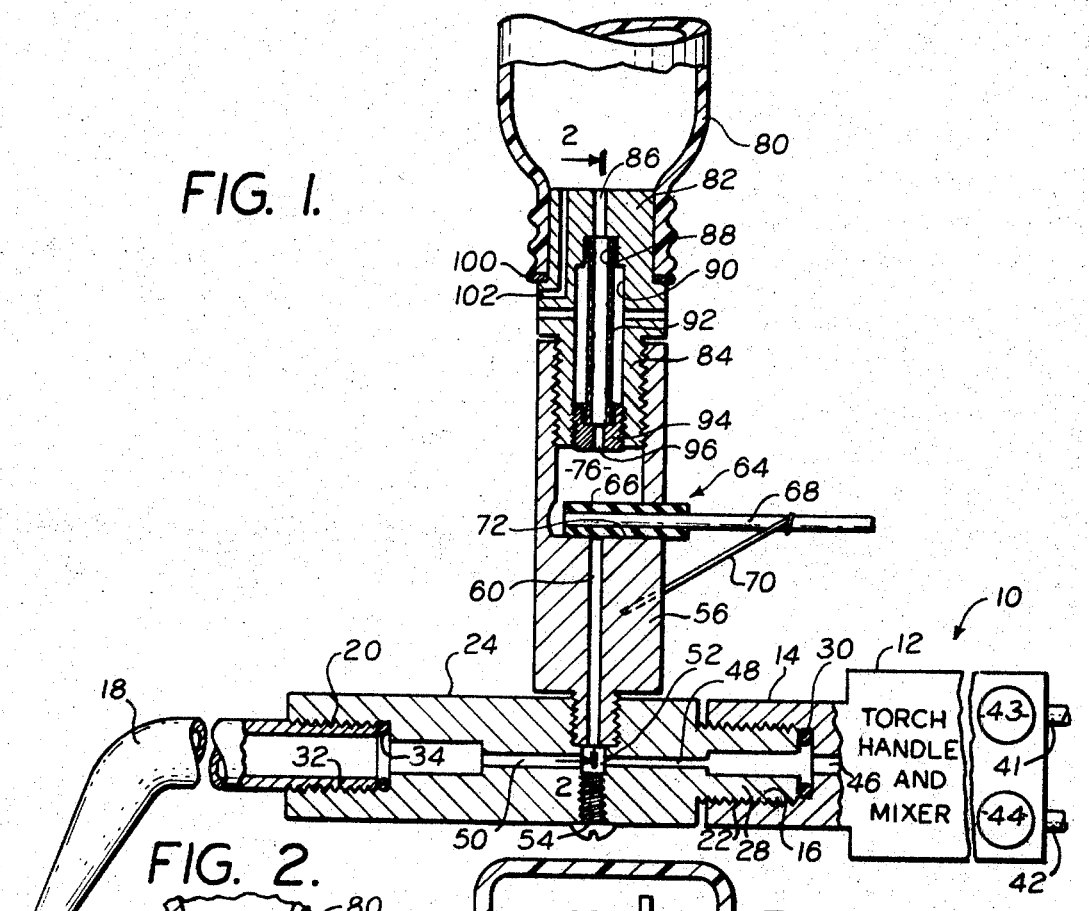
FIG. 1.
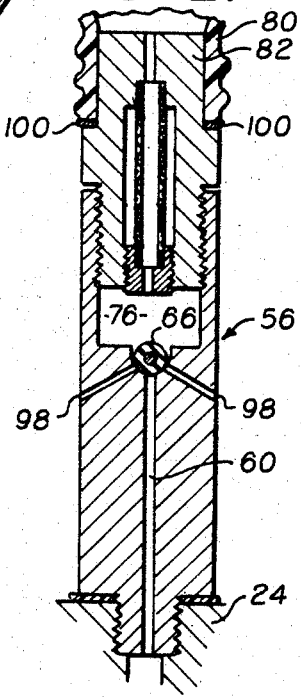
FIG. 2.
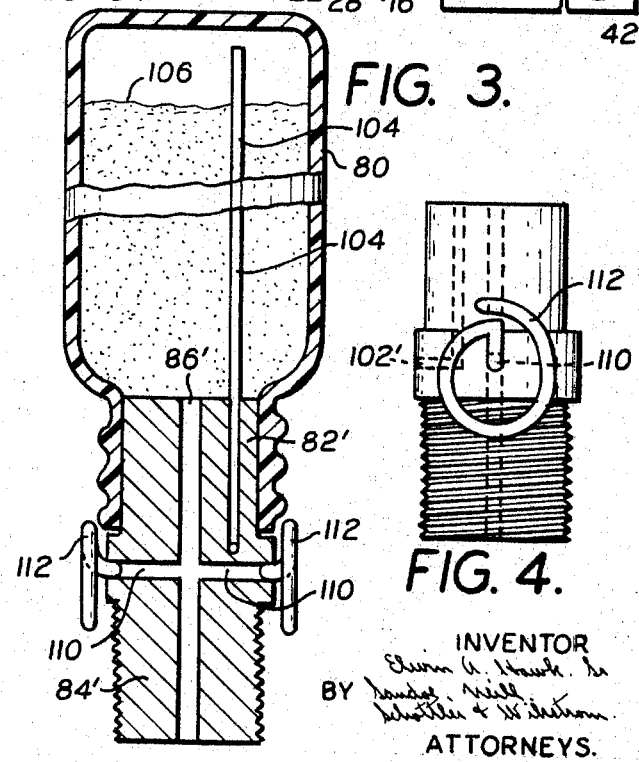
FIG. 3.
FIG. 4.

3,436,019
ADAPTER FOR CONVERTING TORCH TO POWDER SPRAY WORK
Elwin A. Hawk, Sr., East Rochester, Ohio, assignor to Coast Metals, Inc., Little Ferry, N.J., a corporation of Delaware
Filed May 24, 1966, Ser. No. 552,575
Int. Cl. B44d 1/097; B05b 7/30, 7/20
U.S. Cl. 239—85      7 Claims

ABSTRACT OF THE DISCLOSURE

A torch that includes an adapter which can be inserted between the handle and tip of a conventional welding torch to make the torch into a powder spray torch for applying hard surfacing material. The adapter is connected at its opposite ends to the threads of the handle and tip by which these parts were originally connected to one another. A vent is provided along the powder passage for preventing pressure of a flashback from reaching the powder holder; and this vent is controlled by the same valve means that regulate the flow of powder to the torch.

BACKGROUND AND SUMMARY OF THE INVENTION

This invention relates to torches from which powder is sprayed against the work that is heated by the torch for applying a coating of the powdered material to the heated surface.

It is an object of the invention to provide a torch construction with an adapter between parts of the torch for connecting a powder supply to the torch with provision for feeding the powder into the gas stream for discharge from the flame jet orifices of the torch tip.

It is another object to provide an adapter that can be inserted between the tip and torch body for converting an ordinary heating torch into a powder spray torch. In the preferred construction, the adapter has a projecting portion at its upstream end which screws into the torch body in place of the tip, and it has a threaded recess at its other end for connection with the tip. A powder hopper, or other means for supplying powder, is connected with the adapter; and there is an aspirator within the adapter for drawing powder into the gas stream.

Means for controlling the powder flow are also connected with the adapter and provided with a manually operated element extending toward the handle of the torch body for manipulation by the hand of an operator who is holding the torch.

Other objects, features and advantages of the invention will appear or be pointed out as the description proceeds.

BRIEF DESCRIPTION OF THE DRAWINGS

In the drawing, forming a part hereof, in which like reference characters indicate corresponding parts in all the views:

FIGURE 1 is a diagrammatic sectional view of a torch equipped with the adapter of this invention;

FIGURE 2 is a sectional view taken on the line 2—2 of FIGURE 1;

FIGURE 3 is an enlarged view of a modified construction for a portion of the powder feed means illustrated in FIGURES 1 and 2; and FIGURE 4 is a side elevation of a part of the structure shown in FIGURE 3, the view being taken at right angles to FIGURE 3.

DESCRIPTION OF THE PREFERRED EMBODIMENTS

FIGURE 1 shows a torch body 10 having a handle portion 12 with a downstream end 14 in which there is a recess 16 for receiving a tip 18. The tip has threads 20 which screw into corresponding threads 22 in the recess 16; and the tip is screwed into the recess 16 when the torch is used as a heating torch.

In accordance with this invention an adapter comprising a fitting 24 is inserted between the handle portion 12 and the tip 18. The adapter fitting 24 has an extension 28 with the same thread as the thread 20 of the tip; and this extension 28 is screwed into the recess 16 in place of the tip 18. A sealing washer 30 between the end of the extension 28 and the end face recess 16 prevents escape of gas along the threads 22.

At the other end of the fitting 24 there is a threaded recess 32 which corresponds to the recess 16 in the handle portion of the torch; and the tip 18 screws into this recess 32 with a sealing ring 34 for preventing leakage of gas along the threads 20.

Oxygen and fuel gas are supplied to the torch 10 through tubes 41 and 42 respectively; and the flow of oxygen and fuel gas are regulated by valves 43 and 44, respectively, in the upstream end of the torch. There is a mixer in the torch handle and the mixed gases flow through a center discharge passage 46 into the upstream end of the adapter fitting 24. Within the adapter fitting 24 there is a center passage 48 of reduced diameter leading to an aspirator intermediate the ends of the fitting 24. This aspirator comprises the small diameter passage 48 and a larger diameter passage 50, in alignment with the passage 48 and spaced a short distance from it across a chamber 52.

This chamber 52 is actually a part of a powder passage formed in the fitting 24 at right angles to the passages 48 and 50. There is a plug consisting of a screw 54 closing the lower end of the powder passage and there is a housing 56 with its lower end portion screwed into a bore at the upper end of the powder passage which forms the chamber 52. Thus the actual chamber 52, in the assembled structure, is the space between the lower end of the housing 56 and the upper end of the screw plug 54.

A powder passage 60 extends downwardly through the housing 56 and communicates with the chamber 52. Gas flowing from the passage 48 and expanding in the chamber 52 as it enters the larger diameter passage 50, creates a partial vacuum in the chamber 52 and the communicating powder passage 60. This partial vacuum is relied upon to assist gravity in drawing powder into the torch through the powder passage 60. The partial vacuum produced by the aspirator action in the chamber 52 can also be relied upon to draw powder into the torch even though the powder supply is not oriented to produce a gravity feed.

At the upper end of the powder passage 60 there are valve means 64 for controlling the supply of powder to the passage 60. This valve means 64 preferably comprises a valve element 66 made of rubber or other elastometric material, and having a stiff rod 68 extending through it. The rod 68 extends for a considerable distance beyond the valve element 66 in an upstream direction toward and preferably across a short part of the handle portion 12 of the torch so that the rod 68, at its right hand end, can be depressed by the thumb of the hand of an operator holding the torch 10. A leaf spring 70 holds the rod 68 up at its right hand end; but the spring 70 is flexible and yields when thumb pressure is applied to the rod 68 to open the valve. Thus the rod 68 provides a manually actuated valve operating mechanism.

The sleeve of the valve element 66 extends through a circular opening 72 in the side of the housing 56, and fits snugly in this opening. The lower end of this sleeve covers the top of the powder passage 60 and prevents powder from entering this passage except when the valve element 66 is displaced upwardly.

Whenever the rod 68 is pushed downward at its right hand end, this rod tends to rock about the portion which extends through the opening 72 and the left hand end of the rod 68 moves upwardly. This lifts the left hand end of the valve element 66 and causes some distortion and compression of the parts of the valve element 66 which are confined in the opening 72. The compression of the plastic material of the valve element is part of the resilience for restoring the valve element to closed position whenever pressure on the right hand end of the rod 68 is released. Thus the resilience of the plastic of the valve element cooperates with the spring 70 in restoring the valve element to its original position, shown in FIGURE 1.

When the valve element 66 does move upward so as to create a clearance between it and the entrance to the powder passage 60, powder in a valve chamber 76, in the housing 56, flows downward through the passage 60. The rate of flow is partially proportional to the aspirator effect which is in turn proportional to the rate of gas flow; and is also partially proportional to the displacement of the valve element 66 from the inlet end of the powder passage 60.

Powder is supplied to the valve chamber 76 from a powder container 80 which is placed over a connector 82 having a lower end portion 84 that threads into the upper end of the valve housing 76. A powder passage 86 extends downward through the connector 82. This powder passage 86 has a counterbore 88 at one location and a larger counterbore 90 at a slightly lower location. A screen 92 is held in place at its upper end by fitting into the counterbore 88 and it is held in place at its lower end by fitting into a similar counterbore in a bushing 94 threaded into the lower end of the larger counterbore 90. The bushing 94 has a metering port 96 in axial alignment with the powder passage 86 and forming a part of the powder passage 86. The rate of gravity feed of powder from the container 80 through the connector 82 and into the valve chamber 76 can be controlled by inserting bushings 96 with metering ports of various diameters.

The purpose of the screen 92, which is a small mesh for retaining the powder in the powder passage, is to permit the escape of pressure in the event of a flashback when the valve element 66 is open; but its more important function is to permit the entrance of air into the powder passage 86 and the lower powder passage 60 with the powder so that the air serves to some extent as a vehicle for carrying the powder to the torch in a fluffy and easily flowable condition.

There are preferably one or more air vents 98 (FIGURE 2) opening through the sides of he housing 56 at the region close to the upper end of the gas passage 60 and in position to be covered by the valve element 66 when that valve element is in closed position. These vents 98 which slope downwardly away from the valve element 66 so as to permit them to enter the bottom of the valve chamber 76 under the valve element 66, do not permit powder to escape by gravity because there is a suction of air from outside the housing 56 upwardly through the vent passages 98, as the result of the aspirator action within the fitting 24. While the venting of air through the screen 92 is satisfactory for torches of the construction illustrated, and also for gravity powder feed without aspiration, the vents 98 of FIGURE 2 are for use with aspirator torches only.

The connector 82 fits into the mouth of the container 80 in the fashion similar to a cork, but need not be a tight fit if a washer 100 is used to prevent powder leakage. The container 80 is held on the connector 82 by gravity and does not have to rely on friction. Since the container 80 is closed, a vent 102 (FIGURE 1) is provided in the connector 82 for entrance of air into the container 80 to take the place of the powder which is discharged from the container. Ordinarily, the powder is light enough so that the air finds its way upward through the powder to the space in the container above the powder; but if a heavy powder is used in the container, a vent tube 104, such as shown in FIGURE 3, can be used to carry air from a connector 82', or any other connector, to the space in the container 80 above the powder 106.

FIGURES 3 and 4 show a construction which is similar to FIGURES 1 and 2 except for the powder passage through the connector and the means for venting it. Similar parts are indicated by the same reference characters as in FIGURES 1 and 2 but with a prime appended.

Instead of having counterbores for the powder passage 86, and a cylindrical screen, as in FIGURES 1 and 2, the construction shown in FIGURES 3 and 4 has vent passages 110 leading from a powder passage 86' through the side walls of the connector 82'. In order to prevent powder from escaping through these vent passages 110, when the valve is closed and there is no aspirator suction on the passage 86', there are coils of tubing 112 at the outer end of each of the said passage 110. Each of these coils of tubing 112 extends around a generally spiral path for about one revolution and with the effective radius large enough so that for various orientations of the torch and the connector 82, there is always a portion of the coil of tubing 112 which is higher than the vent passage 110 by a distance that provides a head of powder in the tubing sufficient to prevent powder from flowing out through the coil of tubing 112.

Each of the coils of tubing 112 is open at its end remote from the gas passage 110 and at times when there is suction on the gas passage 110, powder which has flowed into any portion of the coils of tubing 112 is carried back into the vent passage 110 and the powder passage 86' by the stream of incoming air.

An inspection of the adapter fitting 24 and the housing 56 and connector 82 in FIGURE 1 shows that all passages which have any change in diameter become larger as they extend toward an end or side of the element in which they are found so that these passages can be drilled in bar stock and no castings are necessary to make the construction illustrated. All passages are straight and it is a feature of the invention that all of the parts of the adapter, housing and connector can be made on a screw machine.

The preferred embodiments of the invention have been illustrated and described, but changes and modifications can be made, and some features can be used in different combinations.

What is claimed is:

1. The combination with a heating torch of an adapter for converting the heating torch into a powder spray torch, the adapter including a fitting that is inserted between a handle part and a tip part of the torch that join together at detachable connections, said fitting having connection portions at its opposite ends, the connection portion at the upstream end of the fitting being the same as that at the upstream end of the tip part, and the connection portion at the downstream end of the fitting being the same as that at the downstream end of the handle part whereby the fitting is adapted to be connected with the handle and tip parts in place of the direct connection of these parts with one another, the fitting having a gas passage therethrough with an aspirator at an intermediate location thereof, a powder passage opening through a side of the fitting and communicating with the suction side of the aspirator, means for connecting a powder container with the fitting by a connection having a powder supply conduit communicating with said powder passage of the fitting, and characterized by the fitting being connected with an upstream part which is the handle part of the torch with a mixer therein, and the fitting being connected with a downstream part which is the tip part through which a combustible gas mixture and a powder stream are discharged against a work piece.

2. The adapter described in claim 1 characterized by the gas passage consisting of longitudinally extending coaxial sections of different diameter, and the powder passage including a bore extending transversely of the longitudinal passage and across the gas passage, and the aspirator having a larger dimeter of the gas passage on the downstream side of the powder passage bore than on the upstream side thereof.

3. The adapter described in claim 2 characterized by the fitting having complementary threads at both ends thereof constituting part of its connection with the other part of a torch, the powder passage bore extending across the full height of the fitting, and a plug threaded into the lower end of the powder passage bore for closing the lower end thereof.

4. The combination in a powder spray torch including a fitting between and connected with upstream and downstream parts of the torch, the fitting having a gas passage therethrough with an aspirator at an intermeidate location thereof, a powder passage opening through a side of the fitting and communicating with the suction side of the aspirator, means for connecting a powder container with the fitting by a connection having a powder supply conduit communicating with said powder passage of the fitting, and characterized by the means for connecting the powder container with the fitting including a housing that mounts on the fitting, valve means in the housing for controlling flow of powder to the aspirator, and valve-operating mechanism extending from the housing in an upstream direction, and further characterized by a vent passage through which gas is supplied to the powder passage of the aspirator, the vent passage being controlled by the valve means and being opened to the passage of gas to the powder passages by the same mechanism that operates the powder valve.

5. The combination described in claim 4 characterized by the vent passage leading through a part of the structure to the outside thereof and providing a vent through which atmospheric air is drawn into the powder stream.

6. The combination in a powder spray torch including a fitting between and connected with upstream and downstream parts of the torch, the fitting having a gas passage therethrough with an aspirator at an intermediate location thereof, a powder passage opening through a side of the fitting and communicating with the suction side of the aspirator, means for connecting a powder container with the fitting by a connection having a powder supply conduit communicating with said powder passage of the fitting, and characterized by the means for connecting the powder container with the fitting including a housing that mounts on the fitting, valve means in the housing for controlling flow of powder to the aspirator, and valve-operating mechanism extending from the housing in an upstream direction, and further characterized by the housing of the valve means being a separate piece from the fitting and connected to the fitting by screw connection, and another housing that connects on top of the valve housing with an extension of the powder passage and outlets for relief of pressure from the powder passage in the event of backfire, means for preventing powder from escaping through said outlets during ordinary operation of a torch with which the adapter is used, a holder at the top of the second housing for receiving a powder container with the interior of said container in communication with the powder passage, a closed powder container on the holder, and a vent for atmospheric air leading into the powder container.

7. The combination in a powder spray torch including a fitting between and connected with upstream and downstream parts of the torch, the fitting having a gas passage therethrough with an aspirator at an intermediate location thereof, a powder passage opening through a side of the fitting and communicating with the suction side of the aspirator, means for connecting a powder container with the fitting by a connection having a powder supply conduit communicating with said powder passage of the fitting, and characterized by the means for connecting the powder container with the fitting including a housing that mounts on the fitting, valve means in the housing for controlling flow of powder to the aspirator, and valve-operating mechanism extending from the housing in an upstream direction, and further characterized by the gas passage consisting of longitudinally extending coaxial sections of different diameter, and the powder passage including a bore extending transversely of the longitudinal passage and across the gas passage, the aspirator having a larger diameter of the gas passage on the downstream side of the powder passage bore than on the upstream side thereof, and further characterized by all of the passages in the adapter being straight and free of any increase in cross-section as they lead away from ends and sides of the adapter whereby the parts of the adapter can be made on a screw machine.

References Cited

UNITED STATES PATENTS

| | | | |
|---|---|---|---|
| 2,786,779 | 3/1957 | Long et al. | 239—85 X |
| 3,172,605 | 3/1965 | Brooks | 239—85 |
| 3,194,501 | 7/1965 | Cape | 239—85 |
| 3,226,028 | 12/1965 | Schilling | 239—85 X |
| 3,228,610 | 1/1966 | Quaas et al. | 239—85 |

ALLEN N. KNOWLES, *Primary Examiner.*

HOWARD NATTER, *Assistant Examiner.*

U.S. Cl. X.R.

239—289, 310